US006893991B2

(12) United States Patent
Araujo et al.

(10) Patent No.: US 6,893,991 B2
(45) Date of Patent: May 17, 2005

(54) HIGH SILVER BOROSILICATE GLASSES

(75) Inventors: Roger J. Araujo, Horseheads, NY (US); Donald M. Trotter, Jr., Newfield, NY (US)

(73) Assignee: Corning Incorporated, Corning, NY (US)

( * ) Notice: Subject to any disclaimer, the term of this patent is extended or adjusted under 35 U.S.C. 154(b) by 123 days.

(21) Appl. No.: 09/930,718

(22) Filed: Aug. 15, 2001

(65) Prior Publication Data

US 2005/0032623 A1 Feb. 10, 2005

Related U.S. Application Data (63) Continuation-in-part of application No. 09/639,479, filed on Aug. 15, 2000, now abandoned.

(51) Int. Cl.$^7$ .......................... C03C 3/091; C03C 3/064; C03C 6/02
(52) U.S. Cl. ............................. 501/66; 501/27; 501/31; 501/77
(58) Field of Search ............................. 501/27, 31, 66, 501/77

(56) References Cited

U.S. PATENT DOCUMENTS

| | | | |
|---|---|---|---|
| 3,524,737 A | | 8/1970 | Doyle et al. .................... 65/30 |
| 3,615,322 A | | 10/1971 | Bogart et al. ................... 65/30 |
| 3,615,323 A | | 10/1971 | Cornelissen .................... 65/30 |
| 3,639,113 A | | 2/1972 | Aslanova et al. ............... 65/30 |
| 4,075,024 A | * | 2/1978 | Armistead ..................... 501/58 |
| 4,160,654 A | | 7/1979 | Bartholomew et al. ......... 65/30 |
| 4,414,281 A | | 11/1983 | Hoda .......................... 428/433 |
| 5,007,948 A | | 4/1991 | Araujo ...................... 65/30.13 |

FOREIGN PATENT DOCUMENTS

| | | | | |
|---|---|---|---|---|
| JP | 07048142 A | * | 2/1995 | ............ C03C/14/00 |
| JP | 2000203876 A | * | 7/2000 | ............. C03C/4/00 |
| JP | 2000302478 A | * | 10/2000 | ............. C03C/4/00 |

OTHER PUBLICATIONS

Machine translation of JP 2000–203876.*
Machine translation of JP 07–048142.*
Machine translation of JP2000–302478.*
Rindone, G.E, "XVI.–The Spontaneous Growth of Silver Films on Glasses of High Silver Content", "Journal of Society of Glass Technology", 37 (1953), 124–128.*
Kaps, Karthe, Muller, Possner, and Schreiler, "Glasses for Optoelectronics", *ECO Proceedings*, Paris France, vol. 1128, Apr. 24–27, 1989.
Araujo, "Journal of Non–Crystalline Solids", 58, (1983), 201–208.
Araujo and Fehlner, "Journal of Non–Crystalline Solids", 197, (1997), 154–163.
Araujo and Schreurs, "Phys. Chem. Glasses", 23, (1982), 109.
Araujo, "Journal of Non–Crystalline Solids", 81, (1986), 251–254.

* cited by examiner

*Primary Examiner*—Karl Group
*Assistant Examiner*—Elizabeth A. Bolden
(74) *Attorney, Agent, or Firm*—Siwen Chen; Timothy M. Schaeberle (57) ABSTRACT

The invention relates to a melt-formed, high-silver, alkali-free, borosilicate glass that can be used for fabricating optical devices. For gradient index lenses, the glass can be subjected to an ion exchange process in order to introduce a less polarizable ion onto the glass surface having a higher refractive index on the surface relative to the center of the glass. The glass is unique in that the silver ions are not introduced by ion exchange. Rather, the high silver content of the glass is achieved during melting. As melted, the transparent alkali-free, borosilicate glass produced by the inventive method contains a high concentration of silver, exhibits a high refractive index and negligible attenuation at wavelengths longer than about 400 nm, making it particularly suitable for high performance fiber optic components such as gradient index or so-called GRIN lenses.

49 Claims, 4 Drawing Sheets

HIGH SILVER BOROSILICATE GLASSES

CROSS-REFERENCE TO RELATED APPLICATION

This is a Continuation-In-Part of U.S. Ser. No. 09/639,479, filed Aug. 15, 2000, now abandoned entitled High Silver Borosilicate Glasses, of Roger J. Araujo and Donald M. Trotter. Jr.

BACKGROUND OF THE INVENTION

This invention has for a specific objective the production of gradients in the refractive index of glass articles through the use of ion exchange techniques, such technology being applicable to the optical engineering field, particularly the making of high performance fiber optic components such as gradient index (GRIN) lenses.

The current interest in making high performance fiber optic components has led to a resurgence of efforts to further pursue optical engineering technologies. One such technology being developed combines ion exchange techniques with photolithography for integrating optical wave-guides in a glass substrate. Optical wave-guides can be embedded in a glass substrate to create a wide variety of optical circuits and passive optical functions for devices such as splitters, stars, wavelength division multiplexers, and optical power taps. These functions are readily integrated into a single glass substrate to facilitate component miniaturization and controlled performance. Such research was presented by Kaps, Karthe, Muller, Possner, and Schreiler in "Glasses for Optoelectronics," ECO Proceedings, Paris, France, Vol. 1128, Apr. 24–27, 1989.

Ion exchange, a technique for producing gradients in the refractive index of glass articles, has been in use since the early sixties. The essence of this method lies in the exchange of ions having different polarizabilities, viz., exchanging one alkali ion for another. For example, U.S. Pat. Nos. 3,524,737 and 3,615,322 describe techniques for strengthening glass whereby the sodium ion in glass is replaced by potassium and copper ions, respectively. Similarly, U.S. Pat. No. 3,615,323 describes a similar glass strengthening technique, with the sodium ion being replaced by a lithium ion. Modest changes in refractive index are achieved by such exchanges.

Presently, thallium has commonly been chosen over other elements as a doping ion to create regions with a higher refractive index. Large changes in the refractive index of glasses have been achieved by the ion exchange of thallium; however, the use of thallium is limited to some extent by its toxicity. Nevertheless, thallium is the ion most often used today in ion exchange processes in spite of its inherent toxicity problems. The silver ion is very polarizable and is expected to produce a change in refractive index comparable to that produced by tantallum and it is free of toxicity problems.

The potential benefit of silver in the production of high index silicate glasses has not been fully realized because it has been observed that the introduction of more than minimal amounts of silver into a silicate glass by ion-exchange techniques invariably led to extensive chemical reduction of the silver and often led to the formation of macroscopic particles of metallic silver. The direct-consequence when this occurs is an unacceptable decrease in the concentration of ionic silver in the glass. In other cases, the reduction caused the formation of large colloids of silver with an attendant unacceptable increase in attenuation in the optical path of the lens. The intense color which characterizes the for Nation of large colloids when silver is reduced is unacceptable for certain applications where an essentially colorless, transparent glass is required.

In co-assigned, U.S. Pat. No. 5,007,948, we demonstrated that silver is not reduced when it is added by ion exchange to a glass which does not contain non-bridging oxygen atoms and does not contain polyvalent ions. The introduction of silver to a glass rod by ion exchange produces a body having a higher refractive index on the surface than that in the interior. However, for many optical applications, it is desirable to have the higher index on the interior. One method which has been demonstrated for achieving this involves two separate ion-exchange steps. In the first, a high uniform concentration of silver is introduced throughout the body of the optical device (such as glass). In the second ion exchange step, a less polarizable ion, such as sodium, is introduced to the surface layer of the device. In order to obtain a uniform concentration of silver, the time required to complete the first ion-exchange process is very long.

The fabrication of an optical device with a low refractive index on the surface would be more convenient if it were possible to melt a glass containing a high concentration of silver so that only a single relatively short ion exchange step will be required to introduce less polarizable ions to the surface of the device. Thus, there continues to be a need for different methods for making high performance fiber optic components such as gradient index lenses.

SUMMARY OF THE INVENTION

The basic product of the present invention is a "batch-melted" high-silver, borosilicate glass that can be used for fabricating optical devices. More specifically, it is a glass in which a high uniform concentration of silver is obtained without recourse to a lengthy process of ion exchange. For the production of gradient index lenses, the glass can be subjected to an ion exchange process in order to introduce a less polarizable ion onto the glass surface.

In one aspect, the invention relates to transparent borosilicate glass produced by melting a batch containing a high concentration of silver (greater than 2 cation percent), said glass having a high refractive index and said glass having negligible attenuation at wavelengths longer than about 400 nm. Preferably, the glass is a borosilicate glass having silver content of at least 8 cation percent.

In a further aspect, the inventive glass contains high field strength ions such as alumina, zirconia and tantala. Preferably, the glass contains alumina, and optionally, zirconia and/or tantala. It is also preferred that the ratio of alumina to zirconia and/or tantala be at least 3:1 in order to prevent or minimize haze.

In yet another aspect, the ratio of high field strength ions to monovalent ions in the inventive glass is at least 1.

In still a further aspect, the invention relates to a method of making an high-silver, borosilicate glass by:
  a. mixing a batch that is essentially free of polyvalent ions, that contains at least as many high field strength ions such as aluminum atoms as it does monvalent atoms; and b. melting the batch for a time sufficiently long to produce a homogeneous glass, free of seeds and stones.

It is important to melt the glass for a long period of time in order that any colloidal silver that is formed in the early stages of melting will be re-oxidized. Preferably, the batch is melted at the lowest feasible temperature because the thermodynamic driving force for the oxidation of the silver decreases as the melting temperature increases.

By "batch-melted" we mean that the high-silver, borosilicate glass is obtained by melting and not by ion-exchange;

By "high-silver," we mean borosilicate glass made by melting a batch containing at least 2 cation percent silver;

DESCRIPTION OF THE PREFERRED EMBODIMENTS

It is well known that silicate or borosilicate glasses are particularly useful for fabricating optical devices by ion exchange techniques because they exhibit the high degree of chemical durability required for the ion exchange process. Furthermore, it is known that the physical properties of silicates and borosilicates can easily be varied without undue deleterious effects on the chemical durability. It has been generally believed that a silicate or borosilicate glass, containing a high concentration of silver cannot be made by melting a high silver batch without extensive reduction of silver. Until now, it was generally believed that the silver would be extensively reduced in the batch, forming globs of silver.

It is helpful to understand the influence of glass structure on the reduction of silver. It was previously mentioned that non-bridging oxygen atoms contribute to the reduction of silver. We now address the role of composition on the density of non-bridging oxygen atoms.

In silicate glasses that contain alumina and an excess of alkali, each aluminum atom is incorporated in the glass structure by bonds to four oxygen atoms arranged tetrahedrally around the aluminum. Each of the alkali ions in excess of aluminum atoms creates a single non-bridging oxygen atom. Thus, it is possible to inhibit the formation of non-bridging oxygen atoms in silicates only if the number of alkali ions does not exceed the number of aluminum ions. Alkali aluminosilicate glasses in which there is no excess of alkali ions are difficult to melt. When the ratio of silica to alumina is too low, the glasses have a strong tendency to devitrify. When the ratio is very high, the glasses are stable but are extremely viscous at the liquidus temperature. Consequently, it is difficult to obtain seed-free and chord-free glasses.

The situation differs somewhat in borates or borosilicates. In these glasses, the excess alkali (alkali ions minus aluminum atoms) gives rise to tetrahedrally bonded boron atoms if the ratio of the concentration of excess alkali ions to the concentration of boron atoms is sufficiently low. Furthermore, the presence of a significant concentration of boron strongly decreases the viscosity of the melt at the liquidus temperature. Consequently, in borosilicates, one is able to make high quality glass that does not contain non-bridging oxygen atoms.

As explained in, R. J. Araujo, *Journal of Non-Crystalline Solids*, 58, (1983), 201–208, the relative concentrations of tetrahedral boron atoms to non-bridging oxygen atoms in a given borosilicate glass composition varies with the temperature of the glass. Thus, in some glasses in which there are no non-bridging oxygen atoms at room temperature, there may be a significant concentration at temperatures above the liquidus. Consequently, although ionic silver can be introduced into the glasses described in, the '948 patent without reduction to metallic silver by low temperature ion exchange, in general it was not believed that it could be introduced to the glass by melting a batch containing a silver salt. Only in the limit of a very small excess of alkali, does theory predict that there will be no non-bridging oxygen atoms at temperatures higher than the liquidus. Furthermore, in R. J. Araujo, and F. P. Fehlner, *Journal of Non-Crystalline Solids*, 197, (1997), 154–163. See appendix B, it is argued that in the high temperature limit, the "excess alkali" is not accurately indicated by the difference between the alumina concentration and the alkali concentration. Therefore, it is not certain that non-bridging oxygen atoms will not be present above the liquidus temperature even when the concentration of monovalent ions is balanced by alumina.

To test the considerations discussed in the previous paragraph, we began by attempting to introduce small amounts of silver salts (≈2%) to a batch of borosilicate glass in which the number of aluminum ions was equal to the number of monovalent ions (silver plus sodium ions). Silver nitrate was the batch material used to incorporate silver in the glass. The batch was mixed by tumbling for one hour. As expected, even this small amount of silver was strongly reduced. Slugs of metallic silver were found in the bottom of the crucible as well as in suspension in the glass samples. This result is consistent with the theoretical expectation that non-bridging oxygen atoms may be present at sufficiently high temperature even when the concentration of alkali is equal to the concentration of alumina. It is also consistent with the prior belief that larger amounts of silver (greater than 1%) cannot be obtained in borosilicate glass melts simply by adding silver salts to the batch from which the glass is melted.

Next, we tentatively postulated that the energetics of formation of non-bridging oxygen atoms discussed earlier might be correct only in the limit of completely ionic bonding between the monovalent ion and the non-bridging oxygen atom. We further postulated that because of the large polarizability of silver, the bond between silver and oxygen might exhibit significant covalent character. In that case, the bonding energy must be stronger than would be the completely ionic bonding energy between a silver ion and a non-bridging oxygen. We further postulated that the covalent bonding would lead to a lower energy of the system than would be produced by forming reduced silver and unpaired electrons on the "non-bridging" oxygen atoms.

Motivated by the reasoning in the previous paragraphs, and recognizing the bonding mechanism described above, we attempted what otherwise might have been a counter-intuitive experiment. We attempted to melt a batch containing silica, alumina, anhydrous boric oxide, and silver nitrate, thus employing silver as the only monovalent ion in the glass. A batch containing in cation percent, 40% silica, 30% boric oxide, 15% alumina and 15% silver (28% by weight), was melted at 1550° C. A homogeneous, seed-free glass, exhibiting a weak yellow color was obtained. No slug of metallic silver was found either in the crucible or in suspension in the glass sample. Chemical analysis revealed a concentration of silver equal to that batched and thereby confirmed that silver had not been reduced. Thus, we were able to demonstrate that borosilicate glass with a high refractive index resulting from a high concentration of silver ions can be fabricated by melting a batch containing a high concentration (>>1 cation percent) of a silver salt. In so doing we discovered that, even though a small amount of silver cannot be incorporated without reduction in an alkali-borosilicate glass through the melting process, a large amount can be incorporated in an alkali-free borosilicate glass.

Two possibilities are postulated that can explain this paradoxical result. The first possibility is that at the lower concentrations of silver, added as fluxing agents to the batch (ordinarily alkalis such as sodium), produce non-bridging oxygen atoms that in turn cause the silver to reduce. In contrast, silver functions as a fluxing agent without generating non-bridging oxygen when the batch described above is melted to form a homogeneous liquid. If correct, this postulate suggests that high silver glasses that are free of reduced silver can be melted only if the batch is free of alkalis.

The second postulated possibility is that the presence of a substantial amount of alkali in the batch exerts a strong influence on the kinetics of melting the batch. The details of the reaction that occur during melting of the batch may strongly influence the amount of reduced silver found in a batch melted for relatively short times.

In a typical melting operation, various batch materials may have widely varying melting points. For example, silver nitrate melts at 212° C. and aluminum oxide melts at 2054° C. As a result of the wide differences in the melting points of the batch materials, the chemical composition of the liquid phase formed by the melting process vary strongly as a function of time during the early stages of melting. The consequences of this fact are especially important in the melting of the glasses of the instant invention. The silver nitrate and the boric oxide become molten before the silica or the aluminum oxide. Consequently, in the early stages of melting, high concentrations of non-bridging oxygen atoms are bonded to boron atoms. Thus extensive reduction of the silver occurs. As more alumina and more silica become incorporated into the molten phase, the density of non-bridging oxygen atoms decreases and finally vanishes. From that time on, the reduced silver becomes progressively more oxidized as the melting time increases.

Preferably, the batch mixture utilized for forming the high silver glass comprises, in cation percent, 15–60 $SiO_2$, 10–30 $Al_2O_3$, 10–45 $B_2O_3$, and 8–25 $Ag_2O$. More preferably, the cation concentration of Ag ranges between 12.5 cation percent and 25 cation percent. Furthermore, it is preferred that the cation concentration of Ag utilized in the batch material is less than or equal to the concentration of Al.

In a preferred embodiment, the batch comprises a $SiO_2$ concentration ranges between 20 cation percent and 45 cation percent, and a concentration of $B_2O_3$ ranging between 15 cation percent and 30 cation percent.

In a more preferred embodiment the batch mixture of the borosilicate glass comprises the following: a cation concentration of Ag ranging between 12.5 to 25 cation %, the cation concentration of Al is equal to the cation concentration of Ag, and the concentration of $SiO_2$ is in the range of 20 to 40 cation %.

In can be appreciated that the benefits of the preferred compositions embodying this invention are not obtained unless the melting time is sufficiently long. To demonstrate the effect of melting time on the present glass, several glass samples (7, 19, 22 and 24) were subjected to further melting studies. The results are shown in Tables 5 and 6. As shown in Table 5, after two hours of melting at 1550° C., glass composition #7 is highly dichroic. This indicates the presence of a high density of large colloidal silver particles. Covering the crucible to impede the introduction of oxygen from the atmosphere to the melt, makes the absorption and scattering of light even worse.

Figure 1:
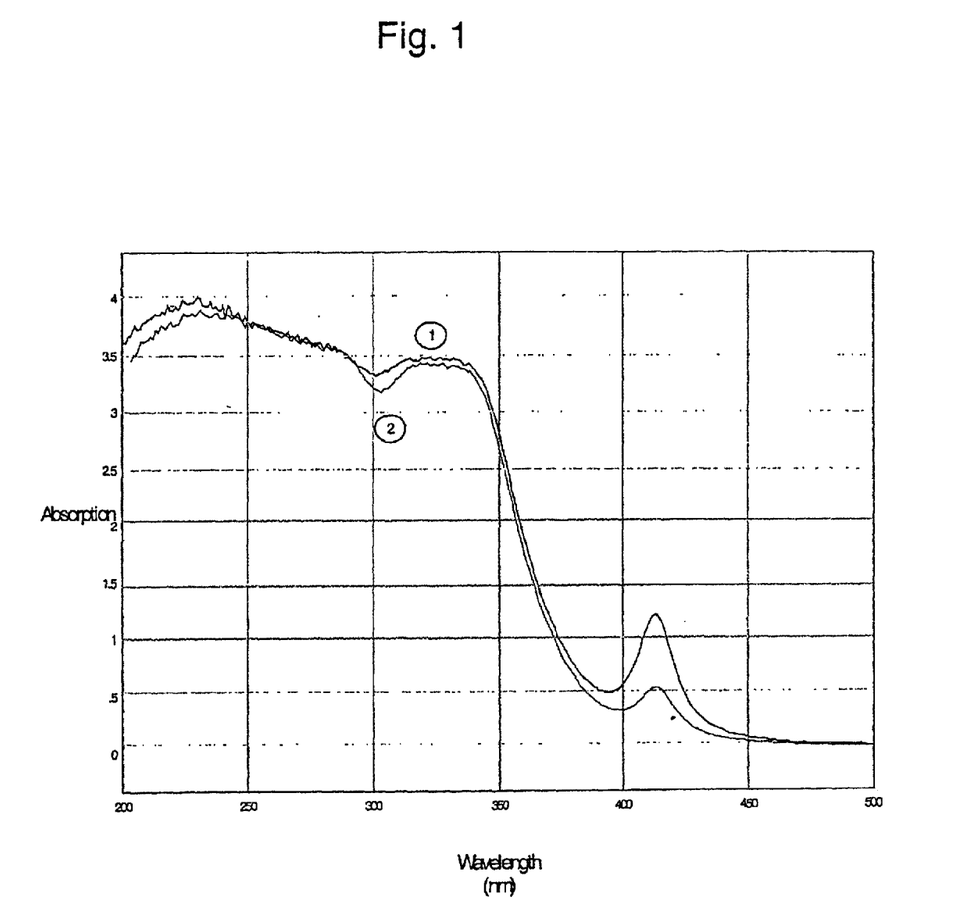
FIG. 1 shows the absorption spectra of the inventive glass after melting for 6 hours (upper curve) and 24 hours (lower curve).

This is further illustrated by FIG. 1 which shows the spectra of two samples of glass #7 of thicknesses 0.54 mm and 0.57 mm which were subjected to six (6) and twenty-four (24) hours of melting respectively. After six hours of melting (line 1), only a moderately pale yellow color was observed. Spectral examination revealed a weak narrow absorption band with a center at about 420 nm, indicating the presence of silver colloid much smaller than the wavelength of light. Neither larger colloids nor macroscopic particles of silver were found. After twenty four hours of melting (line 2), only a very pale yellow color and only a very weak absorption band at about 420 nm was observed.

Next, a thin piece of glass (≅2 mm) was heated to the softening point for one hour. Upon cooling, the glass was completely colorless. This indicates that when sufficient oxygen is allowed to diffuse through the entire body of the melt, the silver can be completely re-oxidized. Because the length of time required for re-oxidation of the silver increases with increasing viscosity, it increases rapidly with decreasing temperature.

The length of time required for reoxidation of aggregates of reduced silver increases rapidly with an increase in aggregate size. Although small colloids may be reoxidized in a few tens of hours, large aggregates may require many years for reoxidation. Therefore the large reduced silver bodies observed in the melts containing both silver and alkali may be a consequence of the influence of the alkali on the kinetics of the melting process and not on the thermodynamic properties of the melt. If this is the case, then it might be possible to change the procedure for mixing and melting a batch containing both silver and alkalies so that silver reduction is prevented.

Extensive experiment revealed that this is, indeed, the case. We have discovered that by ball milling the batch in a large container 3.3 liters with 30 lbs. of ⅞" cylinders and a high media to batch ratio of 15:1, the particle size of the batch can be made sufficiently small and the batch can be mixed sufficiently well that alkali can be tolerated in the batch without reduction of silver. In addition to efficient ball milling, it is advantageous that that the glass a sufficiently low temperature for a sufficiently long time. For example, in batches containing cation percent silver, 25 cation percent boric oxide, 20 cation percent alumina, glasses free of reduced silver can be produced at any arbitrary ratio of silver to alkali when the batch is melted at 1400° C. for sixteen hours; e.g., see Examples 38–40 in Table 7. For higher concentrations of monovalent ions, longer melting times are required to produce essentially colorless glasses.

Although very long times are required to produce colorless glasses, sixteen hours of melting has been found to be satisfactory for the production of glasses that contain only small colloids of silver. For many applications, the weak absorption band at 400 nm due to the presence of these tiny colloids has no significance and the glass, although it appears to the eye to be pale yellow, for all practical purposes, can be considered to be essentially colorless. Furthermore, for certain applications color is of no significance. For example, for telecommunications applications in the 1310 and 1550 nm regions, the presence of visible color is of no significance provided there is effectively no attenuation at these wavelengths.

One aspect of the present invention is the recognition that a borosilicate glass having a high refractive index can be made by melting a batch containing a large amount of a silver salt if the melt does not contain non-bridging oxygen atoms. Non-bridging oxygen atoms are avoided if the melt contains enough alumina (or other high field strength ions) to balance the silver, and if the batch contains no alkali or alkaline earth ions.

A second aspect of the invention is the fact that a high refractive index glass containing a large amount of silver and no alkali was difficult, if not impossible, to make. However the inventors have discovered that a high refractive index glass can in fact be produced if the following conditions are maintained: 1) the melt contains enough alumina to balance the total concentration of monovalent ions; 2) if the batch is milled to sufficiently small particle size and to a sufficiently homogeneous mixture; and 3) if the batch is melted at a low enough temperature. The influences of low temperature melting are shown by the contrast of Sample 36 and Sample 37 in Table 7. Though the glasses have the same chemical composition, the former glass contained no macroscopic reduced silver while the latter contained several metallic silver spheres including one that exceeded 1 cm in diameter. Sample 40 in Table 7 reveals that no reduced silver is observed in a glass containing equal parts of silver and soda when optimal processing is utilized. All the samples in Table 7 were ball milled in the manner described above.

A third aspect of the invention is that one may produce an area on or near the surface of the glass having a low refractive index by an ion exchange process whereby sodium ions replace the silver ions initially in the glass.

Figure 2:
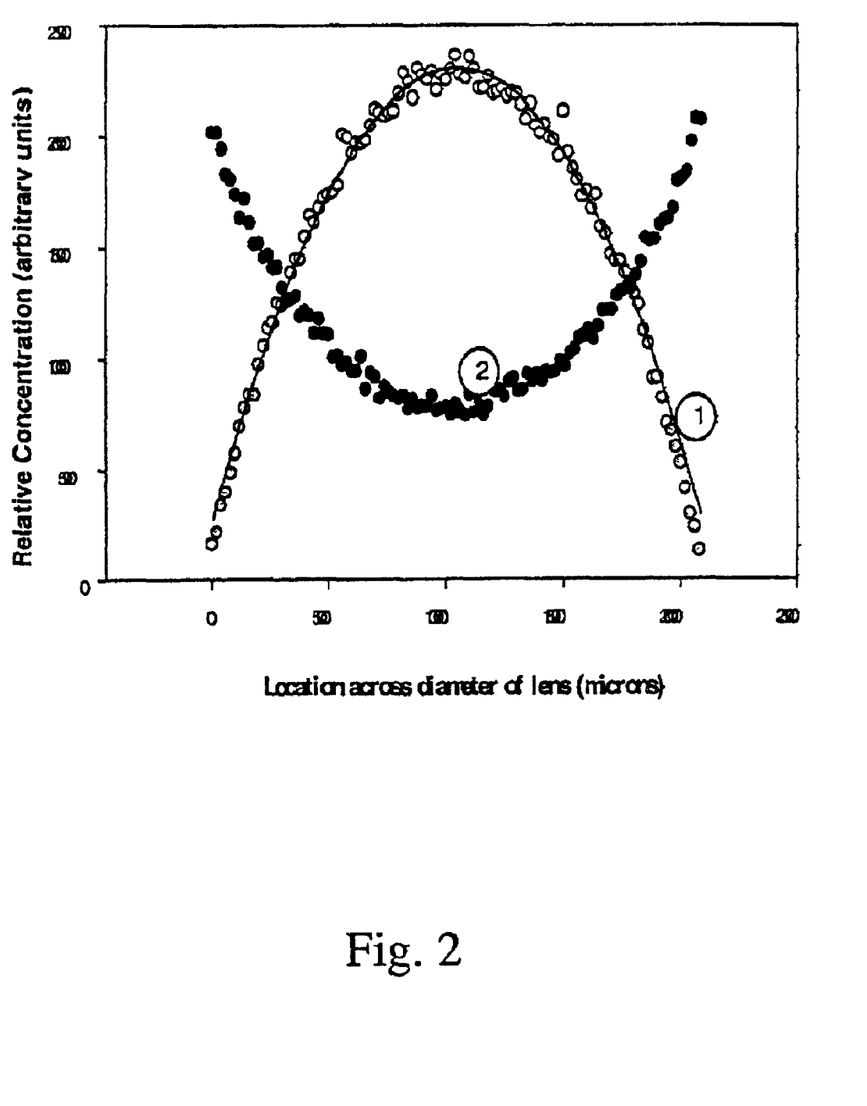
FIG. 2 shows the relative concentrations (determined by microprobe), of silver (curve 1) and of sodium (curve 2) across a rod of a cylinder of inventive glass measuring about 4 mm in diameter which had been ion-exchanged for 111.5 hours in a bath of molten sodium nitrate at 500 C.

A particularly useful application of the glass of the present invention is for making gradient index (GRIN) lenses and other optical elements. To demonstrate this, cane of approximately 2 mm diameter was drawn from a melt of glass of composition 7 in Table 1. Samples of this cane were then ion exchanged in a bath of molten sodium nitrate at 500° C. for various durations. Microprobe analysis across a diameter of a polished cross section of a segment of the cane which had been ion exchanged for about 111.5 hours is shown in FIG. 2 below. The data which have not been normalized, represent the relative concentrations of silver and sodium. As shown, the silver (curve 1) is distributed parabolically (a parabolic fit is shown as the solid line) with the maximum concentration in the center of the rod. This parabolic gradient of refractive index is desirable for a GRIN lens. On the other hand, the sodium concentration (curve 2), initially zero in the glass, has a maximum value at the surfaces of the sample and a minimum value at the center.

Figure 3A:
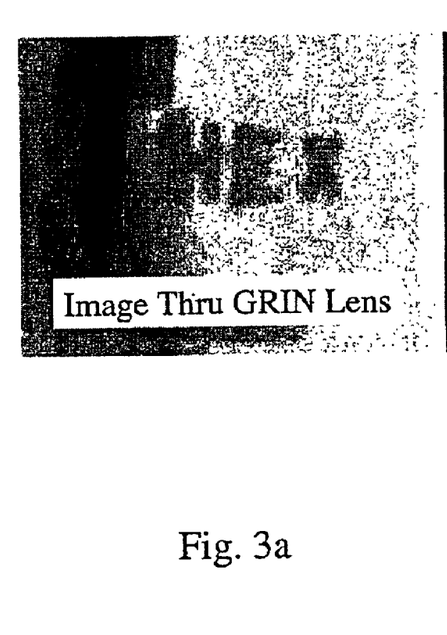
FIGS. 3a and 3b are Word "HEX" (right) imaged (left) using a GRIN lens consisting of the glass rod of FIG. 2.
Figure 3B:
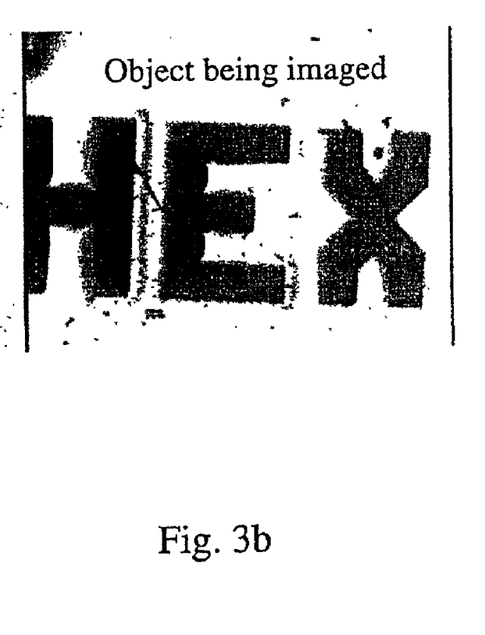
Figure 4:
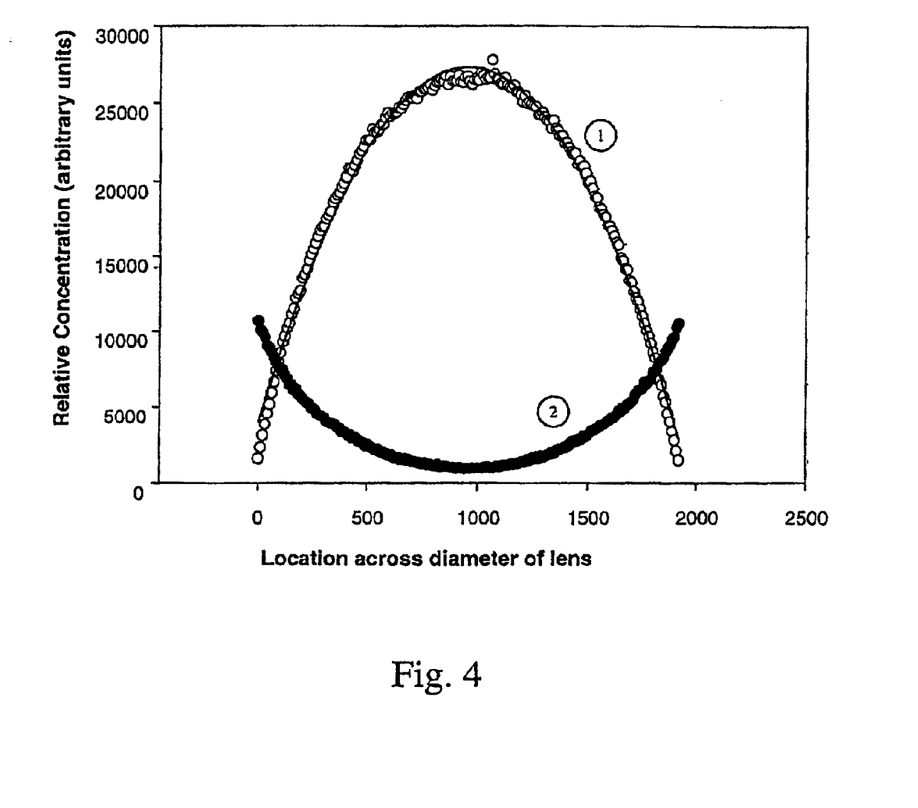
FIG. 4 shows the relative concentrations determined by microprobe of silver (curve 1) and of sodium (curve 2) across a diameter of a cylinder of inventive glass which had been ion exchanged for 32 hours in a bath of molten sodium nitrate at 500 C.

Segments of this cane were further cut to a length of approximately 4 mm and the ends polished. These segments were found to be capable of forming images, as shown in the photo illustrations of FIGS. 3a and 3b. However, the microprobe data also showed that the sodium concentration is not zero at the center of the lens as is most desirable to maximize the index difference (and thus the optical strength) from the inside of the lens to the outside. Accordingly, additional samples of glass #7 were similarly prepared, using a shorter ion exchange time of about 32 hours. Microprobe data from a diameter of a polished cross section of a segment of this cane are shown in FIG. 4. This sample also has the desired parabolic distribution of silver (curve 1), but as shown, the sodium concentration (curve 2) is nearly zero at the center. The refractive index at the center of the rod is thus that of the un-exchanged glass, which measurements on bulk samples show to be 1.5351 at 1550 nm, while the index at the outside surface of the rod should be equal to that of the same glass in which all of the silver has been replaced by sodium. Measurements on a bulk sample of glass of composition 7 which was melted with sodium replacing silver give a refractive index value of 1.4724 at 1550 nm. This index difference is comparable with that of commercial GRIN lenses utilizing thallium ion exchange.

As stated above, in order to inhibit the formation of non-bridging oxygen atoms, the concentration of alumina must be equal to or greater than the concentration of silver. This is required in order to prevent reduction of the silver, with one notable exception described below.

As contemplated by the present invention, a fraction of the alumina may be replaced by other high field strength ions without formation of non-bridging oxygen atoms. Specifically, a fraction of the alumina may be replaced by high field strength ions such as described in the '948 patent, for example, zirconia and tantala. As shown in Table 4, although replacement of 25% of the alumina by alkali causes strong reduction of silver (Example 29), replacement by either zirconia or tantala does not (Examples 30 and 31 respectively). It is expected that replacement of significantly more than 25% of the alumina by these oxides will give rise to objectionable haze (phase separation) and increased silver reduction. The fraction of alumina that can be replaced by other high field strength ions without phase separation or silver reduction will depend on the particular ion and must be determined experimentally. For most applications, there should be no advantage to decreasing the concentration of alumina by replacing a fraction of it with other high field strength ions. However, it may sometimes be advantageous to replace some of the alumina by oxides such as zirconia or tantala in order to increase the refractive index of the glass, for example. Experiments have indicated that small amounts of PbO or BaO can also be used to assist the index without replacing alumina by high field strength ions; e.g., see Table 8.

EXAMPLES

The glasses whose compositions are listed in tables 1, 2, 3, and 4 were all melted at 1550° C. for a period of six hours. The melts were poured and formed into ⅜ thick patties and then annealed at 600° C. Samples 1 through 3 in Table 1 show that, in glasses containing high concentrations of alkali, even when the concentration of alkali is equal to that of alumina, silver is strongly reduced leading to the formation of macroscopic particles of metallic silver. Samples 4 and 5 show in glasses containing high concentrations of alkali that, even when the alumina is equal to the sum of the monovalent ions (silver plus alkali), even though theory predicts the absence of non-bridging oxygen atoms at room temperature, silver is strongly reduced. Sample 9 shows that, in a glass containing only a small amount of alkali, when the sum of the concentrations of monovalent ions exceeds the concentration of alumina silver is strongly reduced. A similar but weaker effect is observed in sample 8, wherein less alkali is incorporated. No macroscopic particles of silver are observed. However, the yellow-orange color indicates the formation of a low density of silver colloids whose size is nearly equal to the wavelength of light. Only a pale yellow color is observed in sample 7. This indicates the presence of a very low density of silver colloids whose size is much smaller than the wavelength of light. For many applications, such a low level of light absorption is insignificant and sample 7 can be considered to be essentially colorless. Sample 7, therefore, is submitted as an embodiment of the present invention.

Macroscopic particles of silver are observed in sample 6 even though the concentration of alumina is equal to that of silver and even though the glass contains no alkali. The inventors believe that melting for a sufficiently long time may have eventually caused the silver to be re-oxidized and incorporated in the glass structure. Nevertheless, we believe that there is an upper limit to the concentration of silver that can be incorporated without reduction in these glasses. In, RJ. Araujo and J. W. H. Schreurs, *Phys. Chem. Glasses,* 23, (1982), 109 it was demonstrated that an increased concentration of alumina progressively inhibited the formation of tetrahedral boron even when the ratio of excess alkali to boron was maintained constant. Thus, it may be deduced that there is an upper limit to the amount of silver that may be incorporated because the high concentration of alumina required to balance it inhibits the formation of tetrahedral boron and promotes the formation of non-bridging oxygen atoms. Furthermore, increasing the concentrations of silver and alumina involves decreasing the concentrations of silica and boric oxide. The important role of silica in stabilizing tetrahedral boron was clarified in, R. J. Araujo, *Journal of Non-Crystalline Solids,* 81, (1986), 251–254. There it was shown that too low a concentration of silica is not desired, not only because of the deleterious effect on the chemical durability of the glass, but also because it would decrease the formation of tetrahedral boron and consequently would promote silver reduction. Thus, depending on the desired application, the upper limit of silver concentration that can be incorporated in the glass will be determined by experimentation taking the above factors into consideration.

No macroscopic particles of metallic silver were observed in sample 19, in which the silver concentration is 17.5 cation percent. Sample 34 reveals that concentrations of silver of up to twenty five percent can be incorporated without reduction by melting for very long times. It is difficult to predict the highest level of silver that can be incorporated without silver reduction. However, there is no important advantage to introducing more than twenty-five percent silver since the refractive index in such a glass would be high enough for most applications.

Sample 38 shows that using the inventive method glass can be melted from a batch with 5 cation percent silver and as much as 16 cation percent soda without formation of silver globs (i.e, without reducing the silver). However, the refractive index of such a glass would not be high enough for many of the intended applications.

TABLE 1

(Cation Percent)

| | Sample | | | | | | | | |
|---|---|---|---|---|---|---|---|---|---|
| | 1 | 2 | 3 | 4 | 5 | 6 | 7 | 8 | 9 |
| $SiO_2$ | 35.0 | 35.0 | 35.0 | 40.0 | 40.0 | 40.0 | 40.0 | 40.0 | 40.0 |
| $Al_2O_3$ | 27.5 | 27.5 | 27.5 | 20.0 | 20.0 | 20.0 | 15.0 | 14.0 | 13.0 |
| $B_2O_3$ | 7.5 | 7.5 | 7.5 | 20.0 | 20.0 | 20.0 | 30.0 | 30.0 | 30.0 |
| $Na_2O$ | 27.5 | 22.5 | 15.0 | 17.5 | 12.5 | 0.0 | 0.0 | 1.0 | 2.0 |
| $Ag_2O$ | 2.5 | 7.5 | 15.0 | 2.5 | 7.5 | 20.0 | 15.0 | 15.0 | 15.0 |
| Silver globs | Yes | Yes | Yes | Yes | Yes | Yes | No | No | Yes |
| Color | | | | | | | Pale Yellow | Yellow Orange | |

Sample 12 is paler than sample 11 and sample 24 is darker than sample 11, thereby illustrating the beneficial influence of a moderately high silica level. Samples 20 and 21 are progressively paler than sample 12, thereby further illustrating the benefit of high silica. However, sample 22, which is poorly melted and extremely seedy, contains tiny metallic silver bullets. The present authors believe that the high viscosity caused by the high concentration of silica not only makes it difficult to obtain good glass quality, it also unacceptably slows the re-oxidation of the silver. Raising the melting temperature would provide a method of improving the glass quality. However, the melting temperature is limited by the strong decrease in the chemical potential of oxygen in the atmosphere as the temperature is increased. In other words, if the melting temperature were too high, reduced silver would be thermodynamically stable. Thus, it can be seen that there exists an optimal value for the concentration of silica. If one assumes that the maximum temperature that can be used for melting this family of glasses is 1600° C., then the optimal silica concentration must lie between 40% (cation percent) and 60%. Even if higher melting temperatures can be utilized, no advantage in the use of silica concentrations higher than 60% is foreseen. Sample 27 demonstrates that essentially colorless glasses can be produced when the alumina concentration exceeds slightly the concentration of silver. Of course, as mentioned above, it is preferred that the alumina concentration be less than 25%.

TABLE 4

(Cation Percent)

| | Sample | | | |
|---|---|---|---|---|
| | 28 | 29 | 30 | 31 |
| $SiO_2$ | 40.0 | 40.0 | 40.0 | 40.0 |
| $Al_2O_3$ | 12.5 | 9.375 | 9.375 | 9.375 |
| $B_2O_3$ | 35.0 | 35.0 | 35.0 | 35.0 |
| $Ag_2O$ | 12.5 | 12.5 | 12.5 | 12.5 |
| $Na_2O$ | 0 | 3.175 | 0 | 0 |
| $ZrO_2$ | 0 | 0 | 3.175 | 0 |
| $Ta_2O_5$ | 0 | 0 | 0 | 3.175 |
| Clarity | Very clear | Opaque | Slight haze | Slight haze |
| Color | Pale Yellow | Yellow with red streaks | Pale yellow | Pale Yellow |

TABLE 5

| | Time | | | |
|---|---|---|---|---|
| | 2 hrs (with cover) | 2 hrs | 6 hrs | 24 hrs |
| Color | Dichroic | Dichroic | Pale Yellow | Very Pale Yellow |

Many of the samples discussed in this teaching document were melted for six hours at 1550° C. Of course, the glasses can be melted at somewhat higher or slightly lower temperature. However, it is important to remember that the

TABLE 2

(Cation Percent)

| | Sample | | | | | | | | |
|---|---|---|---|---|---|---|---|---|---|
| | 10 | 11 | 12 | 13 | 14 | 15 | 16 | 17 | 18 |
| $SiO_2$ | 35.0 | 40.0 | 45.0 | 40.0 | 37.5 | 37.5 | 35.0 | 40.0 | 42.5 |
| $Al_2O_3$ | 27.5 | 12.5 | 12.5 | 10.0 | 17.5 | 17.5 | 27.5 | 17.5 | 17.5 |
| $B_2O_3$ | 7.5 | 35.0 | 30.0 | 40.0 | 30.0 | 30.0 | 7.5 | 27.5 | 25.0 |
| $Na_2O$ | 0.0 | 0.0 | 0.0 | 0.0 | 0.0 | 2.5 | 2.5 | 2.5 | 2.5 |
| $Ag_2O$ | 30.0 | 12.5 | 12.5 | 10.0 | 15.0 | 12.0 | 27.5 | 12.5 | 12.5 |
| Silver globs | Yes | No | No | No | No | Yes | Yes | Yes | Yes |
| Color | | Yellow | Pale Yellow | Pale Yellow | Very Pale Yellow | | | | |

TABLE 3

(Cation Percent)

| | Sample | | | | | | | | |
|---|---|---|---|---|---|---|---|---|---|
| | 19 | 20 | 21 | 22 | 23 | 24 | 25 | 26 | 27 |
| $SiO_2$ | 40.0 | 50.0 | 55.0 | 60.0 | 40.0 | 35.0 | 45.0 | 35.0 | 37.5 |
| $Al_2O_3$ | 17.5 | 12.5 | 12.5 | 12.5 | 12.5 | 12.5 | 20.0 | 20.0 | 17.5 |
| $B_2O_3$ | 25.0 | 25.0 | 20.0 | 15.0 | 35.0 | 40.0 | 15.0 | 25.0 | 30.0 |
| $Ag_2O$ | 17.5 | 12.5 | 12.5 | 12.5 | 12.5 | 12.5 | 20.0 | 20.0 | 15.0 |
| Silver globs | No | No | No | Yes | No | No | Yes | Yes | No |
| Color | Golden yellow | Pale Yellow | Very Pale Yellow | | Yellow | Yellow | | | Very Pale Yellow | chemical potential of oxygen in the atmosphere decreases as the temperature increases. Therefore, there is an increased tendency for silver reduction as the melting temperature is increased. Table 6 shows that, for a variety of compositions, a significant difference in color is produced by a difference in melt temperature. Although the glasses can be melted at 1600° C., this causes stronger yellow color without producing any additional benefit. Therefore, it is not preferred that the glasses be melted at a temperature higher than 1550° C.

TABLE 6

| | Sample # | | | | | | | |
|---|---|---|---|---|---|---|---|---|
| | 7 | 7 | 19 | 19 | 22 | 22 | 24 | 24 |
| Temp | 1600 C. | 1500 C. | 1600 | 1500 | 1600 | 1500 | 1600 | 1500 |
| Time | 16 hrs | 72 hrs | 16 | 72 | 16 | 72 | 16 | 72 |
| Color | Yellow | Almost colorless | Yellow | Almost colorless | Almost colorless | Colorless | Yellow | Almost colorless |

TABLE 7

| | Sample | | | | | | | | |
|---|---|---|---|---|---|---|---|---|---|
| | 32 | 33 | 34 | 35 | 36 | 37 | 38 | 39 | 40 | 41 |
| $SiO_2$ | 35 | 30 | 25 | 15 | 35 | 35 | 40 | 40 | 40 | 40 |
| $Al_2O_3$ | 20 | 25 | 25 | 30 | 25 | 25 | 20 | 20 | 20 | 5 |
| $B_2O_3$ | 30 | 25 | 25 | 30 | 15 | 15 | 25 | 25 | 25 | 30 |
| Ag | 15 | 20 | 25 | 25 | 20 | 20 | 5 | 10 | 7.5 | 15 |
| $Na_2O$ | 0 | 0 | 0 | 0 | 5 | 5 | 10 | 5 | 7.5 | 0 |
| $Ta_2O_5$ | 0 | 0 | 0 | 0 | 0 | 0 | 0 | 0 | 0 | 10 |
| Temp | 1400 | 1400 | 1400 | 1400 | 1350 | 1500 | 1400 | 1400 | 1400 | 1500 |
| Time | 16 | 16 | 16 | 16 | 16 | 6 | 6 | 6 | 6 | 24 |
| Color | Colorless | Yellow | Deep Yellow | Yellow | Yellow | | Colorless | Pale Yellow | Colorless | Yellow |
| Silver globs | No | No | No | No | No | Yes | No | No | No | No |

TABLE 8

| | Sample | |
|---|---|---|
| | 43 | 44 |
| $SiO_2$ | 40 | 40 |
| $Al_2O_3$ | 15 | 15 |
| $B_2O_3$ | 30 | 30 |
| PbO | 0 | 5 |
| BaO | 2.5 | 0 |
| Ag | 15 | 15 |
| Temperature | 1500 | 1500 |
| Time | 16 | 16 |
| Color | Yellow | Yellow |
| Silver globs | No | No |

In addition to the embodiments discussed above, it will be clear to persons skilled in the art that numerous modifications and changes can be made to the above invention without departing from its spirit and scope.

What is claimed is:

1. A batch-melted borosilicate glass essentially free of metallic silver ($Ag^0$), made by melting a batch comprising, in cation percent, 15–60 $SiO_2$ 10–30 $Al_2O_3$, 10–45 $B_2O_3$, and 8–25 $Ag_2O$.

2. The batch-melted glass according to claim 1 wherein the concentration of monovalent ions other than silver does not exceed 2 cation percent.

3. The batch-melted glass according to claim 1, comprising high field strength ions.

4. The batch-melted, glass according to claim 3, wherein the high field strength ions are selected from the group consisting of aluminum, zirconium and tantalum.

5. The batch-melted, glass according to claim 4, wherein the high field strength ions comprise aluminum.

6. The batch-melted glass according to claim 3, characterized in that the ratio of high field strength ions to monovalent ions is at least 1.

7. The borosilicate glass of claim 1, further characterized by being essentially colorless.

8. The borosilicate glass according to claim 1, wherein the cation concentration of Ag is between 12.5 cation percent and 25 cation percent.

9. The borosilicate glass according to claim 8 wherein the cation concentration of Ag is less than or equal to the concentration of Al.

10. The borosilicate glass according to claim 1, wherein the $SiO_2$ concentration is between 20 cation percent and 45 cation percent.

11. The borosilicate glass according to claim 1, wherein the concentration of $B_2O_3$ is between 15 cation percent and 30 cation percent.

12. The borosilicate glass according to claim 1, wherein the cation concentration of Ag is in the range of 12.5 to 25 cation %, the cation concentration of Al is equal to the cation concentration of Ag, and the concentration of $SiO_2$ is in the range of 20 to 40 cation %.

13. The borosilicate glass according to claim 1, characterized in that the Ag ions can be replaced by less polarizable monovalent ions by the process of ion exchange.

14. A batch-melted borosilicate glass comprising aluminum, zirconium and/or tantalum but essentially free of metallic silver ($Ag^0$), made by melting a batch containing at least 2 cation percent silver.

15. The batch-melted, glass according to claim 11, characterized in that the ratio of aluminum to zirconium is at least 3:1.

16. The melt-formed glass according to claim 14, characterized in that the ratio of tantalum to aluminum does not exceed 1:2.

17. A lens comprising a batch-melted borosilicate glass essentially free of metallic silver ($Ag^0$), made by melting a batch containing at least 2 cation percent silver.

18. The lens of claim 17, wherein the borosilicate glass comprises, in cation percent, 15–60 $SiO_2$, 10–30 $Al_2O_3$, 10–45 $B_2O_3$, and 8–25 $Ag_2O$.

19. The lens of claim 17, wherein the borosilicate glass is further characterized by being essentially colorless.

20. The lens of claim 17, wherein the borosilicate glass comprises between 12.5 cation percent and 25 cation percent of silver.

21. The lens of claim 18, wherein in the borosilicate glass, the cation concentration of Ag is less than or equal to the concentration of Al.

22. The lens of claim 18, wherein the borosilicate glass comprises $SiO_2$ between 20 cation percent and 45 cation percent.

23. The lens of claim 18, wherein the concentration of $B_2O_3$ in the borosilicate glass is between 15 cation percent and 30 cation percent.

24. The lens of claim 18, wherein the borosilicate glass the cation concentration of Ag is in the range of 12.5 to 25 cation %, the cation concentration of Al is equal to the cation concentration of Ag, and the concentration of $SiO_2$ is in the range of 20 to 40 cation %.

25. The lens of claim 17, wherein the borosilicate glass further comprises aluminum, zirconium and/or tantalum.

26. The lens of claim 25, wherein in the borosilicate glass the ratio of aluminum to zirconium is at least 3:1.

27. The lens of claim 25, wherein in the borosilicate glass the ratio of tantalum to aluminum does not exceed 1:2.

28. A gradient index lens formed by subjecting a batch-melted borosilicate glass essentially free of metallic silver ($Ag^0$) to an ion-exchange process, said glass being made by melting a batch containing at least 2 carbon percent silver.

29. The lens of claim 28, wherein the borosilicate glass comprises, in cation percent, 15–60 $SiO_2$, 10–30 $Al_2O_3$, 10–45 $B_2O_3$, and 8–25 $Ag_2O$.

30. The lens of claim 28, wherein the borosilicate glass is further characterized by being essentially colorless.

31. The lens of claim 28, wherein the borosilicate glass comprises between 12.5 cation percent and 25 cation percent of silver.

32. The lens of claim 29 wherein in the borosilicate glass, the cation concentration of Ag is less than or equal to the concentration of Al.

33. The lens of claim 29, wherein borosilicate glass comprises $SiO_2$ between 20 cation percent and 45 cation percent.

34. The lens of claim 29, wherein the borosilicate glass the concentration of $B_2O_3$ is between 15 cation percent and 30 cation percent.

35. The lens of claim 29, wherein in the borosilicate glass the cation concentration of Ag is in the range of 12.5 to 25 cation %, the cation concentration of Al is equal to the cation concentration of Ag, and the concentration of $SiO_2$ is in the range of 20 to 40 cation %.

36. The lens of claim 28, wherein the borosilicate glass further comprises aluminum, zirconium and/or tantalum.

37. The lens of claim 36, wherein in the borosilicate glass the ratio of aluminum to zirconium is at least 3:1.

38. The lens of claim 36, wherein in the borosilicate glass the ratio of tantalum to aluminum does not exceed 1:2.

39. A batch-melted borosilicate glass produced by melting a batch containing a high concentration of silver of at least 2 cation percent, said glass being essentially free of metallic silver ($Ag^0$), and part of the Ag ions ($Ag^+$) has been replaced by less polarizable monovalent ions by the process of ion exchange.

40. The borosilicate glass according to claim 39, wherein the batch comprises, in cation percent, 15–60 $SiO_2$, 10–30 $Al_2O_3$, 10–45 $B_2O_3$, and 8–25 $Ag_2O$.

41. The borosilicate glass of claim 39, further characterized by being essentially colorless and transparent.

42. The borosilicate glass according to claim 39, wherein the glass comprises Ag between 12.5 cation percent and 25 cation percent.

43. The borosilicate glass according to claim 42 further comprising aluminum and having a cation concentration of Ag less than or equal to the concentration of Al.

44. The borosilicate glass according to claim 39, wherein the glass comprises $SiO_2$ between 20 cation percent and 45 cation percent.

45. The borosilicate glass according to claim 39, wherein the glass comprises $B_2O_3$ between 15 cation percent and 30 cation percent.

46. The borosilicate glass according to claim 39, wherein the glass comprises Ag ion concentration in the range of 12.5 to 25 cation %, an Al cation concentration equal to the cation concentration of Ag, and a $SiO_2$ concentration in the range of 20 to 40 cation %.

47. The borosilicate glass according to claim 39 further comprising aluminum, zirconium and/or tantalum.

48. The glass of claim 47, wherein the ratio of aluminum to zirconium is at least 3:1.

49. The glass of claim 47, wherein the ratio of tantalum to aluminum does not exceed 1:2.

\* \* \* \* \*